Oct. 1, 1968     J. P. RUTLEDGE ET AL     3,403,854
TEMPERATURE COMPENSATED PRESSURE RELIEF VALVE
Filed June 9, 1966                      2 Sheets-Sheet 1

INVENTORS
JOSEPH P. RUTLEDGE
VERNON N. TRAMONTINI

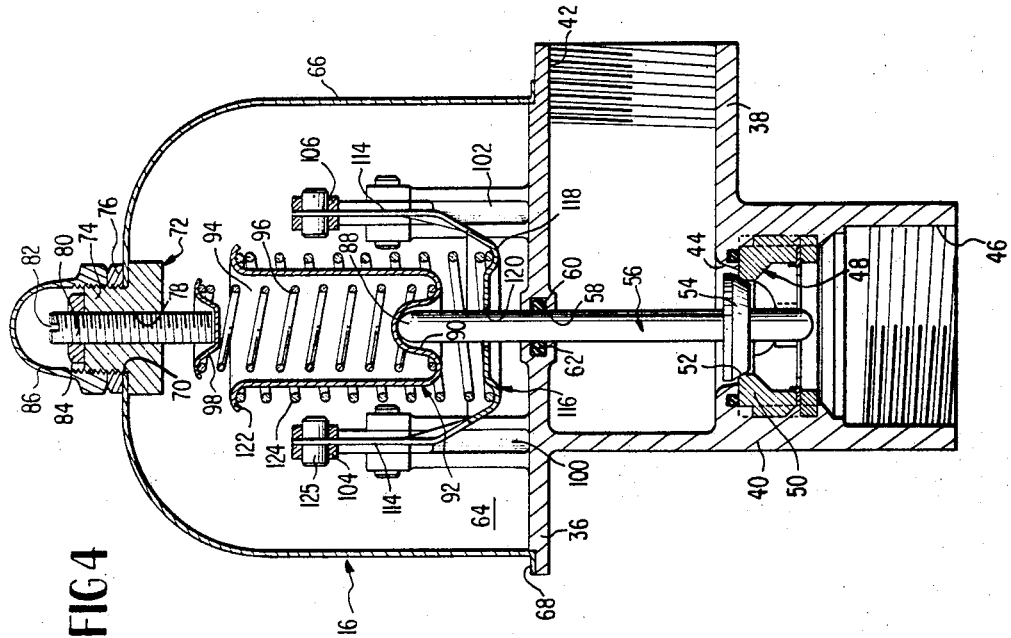
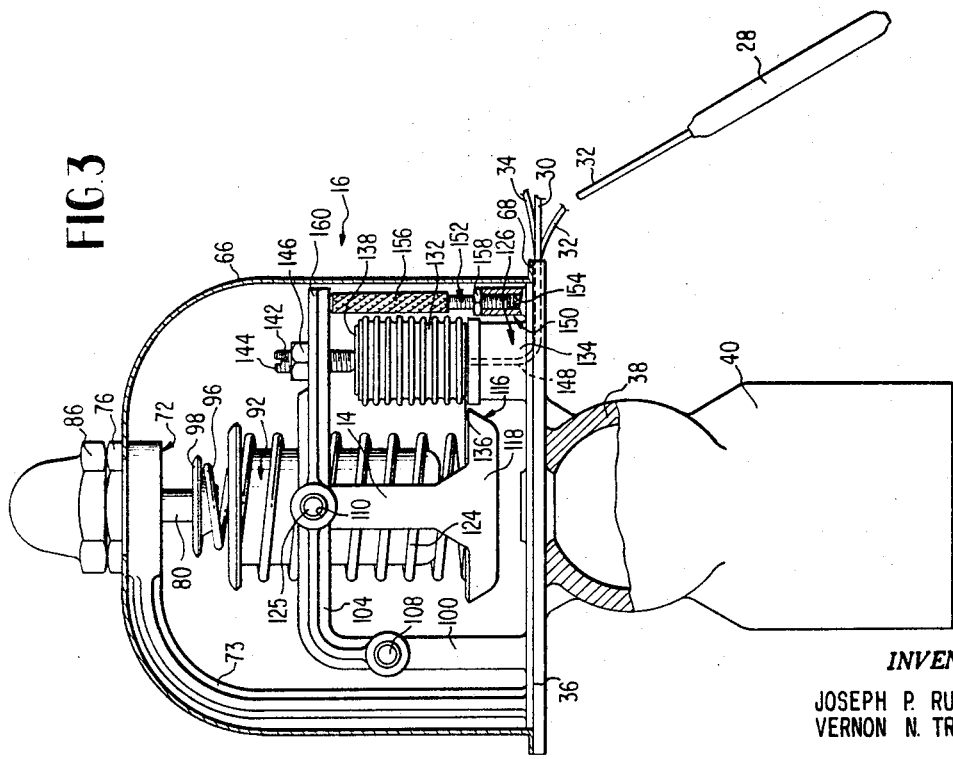

United States Patent Office 3,403,854
Patented Oct. 1, 1968

3,403,854
TEMPERATURE COMPENSATED PRESSURE RELIEF VALVE
Joseph P. Rutledge and Vernon N. Tramontini, Indianapolis, Ind., assignors to Stewart-Warner Corporation, Chicago, Ill., a corporation of Virginia
Filed June 9, 1966, Ser. No. 556,377
7 Claims. (Cl. 236—92)

ABSTRACT OF THE DISCLOSURE

The following specification describes a temperature compensated relief valve in which a spring bias counteracts the spring bias normally applied for closing the pressure relief valve and a plurality of temperature responsive elements are provided for controlling the counteracting bias in accordance with the temperature of the vessel subjected to pressure.

---

This invention relates to a temperature compensated pressure relief valve and more particularly, to a relief valve in which the temperature compensation means acts directly upon the valve pressure biasing means to ensure reduced pressure opening in response to temperature increase of a lightweight pressure vessel.

Pressure vessels in a fluid process art, such as boilers, have been conventionally constructed of cast iron, steel sheeting or other heavy-weight metal which has high rupture strength for carrying a highly pressurized fluid, even at extreme temperatures. Such pressure vessels commonly employ pressure relief valves to prevent rupture of the pressure vessel if the system pressure rises above a predetermined maximum value. In the past, the pressure relief valves have employed temperature compensation means which operate in either of two ways. In one system, in addition to the pressure relief valve which is dependent wholly upon the pressure of the fluid within the system, separate relife valve means are provided which are responsible to the temperature of the fluid carried within the pressure vessel. In an alternate approach, temperature compensation is achieved by providing a decreasing spring constant for the spring member in response to fluid heating. In this case, as the temperature of the fluid contained within the pressure vessel increases and as the spring is heated, the spring constant is thereby reduced allowing the valve to open at a somewhat reduced fluid pressure. The disadvantages to either approach are obvious. In the first case, completely independent temperature release means are employed greatly increasing the cost and complexity of system control. In the second case, temperature compensation is dependent upon the natural transfer of heat to the valve biasing spring which may or may not be correlated to the temperature of the pressure vessel itself and with inherent time delay.

Where lighter weight materials, such as aluminum, are used in the manufacture of pressure vessels, the subjection of the aluminum pressure vessel to moderately elevated temperatures results in a significant strength loss. Therefore, regardless of the employment of conventional pressure relief valves within such a system, if the pressure vessels are subjected to an elevated temperature in which the system pressure is below the maximum allowable value for the pressure relief means, the reduction in strength of the aluminum pressure vessel will cause the pressure vessel to rupture. The employment of conventional temperature compensation means in the manner set forth above fails to give the desired reliability necessary when employing lightweight materials, such as aluminum, as the boiler plate for the pressure vessel.

It is, therefore, a primary object of this invention to provide an improved temperature compensated, pressure relief valve for pressure vessels whose rupture strength decreases significantly with increased temperature.

It is a further object of this invention to provide a pressure relief valve for lightweight material pressure vessel which allows the valve to open at reduced pressure in response to temperature increase of the process fluid on the pressure vessel wall.

It is a further object of this invention to provide an improved temperature compensated pressure relief valve in which the temperature compensation means acts directly upon the fluid pressure control means to ensure positive opening of the valves at reduced pressure correlated directly to the increased temperature of the pressure vessel wall.

It is a further object of this invention to provide a single element relief valve which is positive in operation at either an adjustably present maximum temperature or pressure, or at a desired combination of both parameters.

It is a further object of this invention to provide an improved temperature compensated pressure relief valve for pressure vessels formed of lightweight material in which the relief valve is selectively responsive to localized temperature conditions at any point along the pressure vessel wall.

Further objects of this invention will be pointed out in the following detailed description and claims and illustrated in the accompanying drawings which disclose, by way of example, the principle of this invention and the best mode which has been contemplated of applying that principle.

In the drawings:

FIGURE 3 is a front elevational view, partially in section, of the valve shown in FIGURE 2.

FIGURE 4 is a side elevational view, in section, of the valve shown in FIGURES 2 and 3.

In general, the temperature compensated pressure relief valve of the present invention comprises a valve vent member movable between opened and closed position to allow fluid pressure relief for a lightweight pressure vessel and means for biasing the valve into closed position against the pressure of the fluid. Independent means are provided responsive to temperature increase of the pressure vessel for reducing the bias of the biasing means in proportion of the reduction of allowable stress upon the temperature increase. In a preferred embodiment, a first coil spring biases the valve into closed position in opposition to the fluid pressure and the independent means for reducing the bias of the first spring constitutes a second spring carried by the valve and acts in direct opposition to the first spring. Bellows members coupled by capillary means to fluid pressure operated temperature sensors spaced along the wall of the vessel variably compress the second spring member to achieve overall spring biasing force reduction upon temperature increase.

Figure 5:
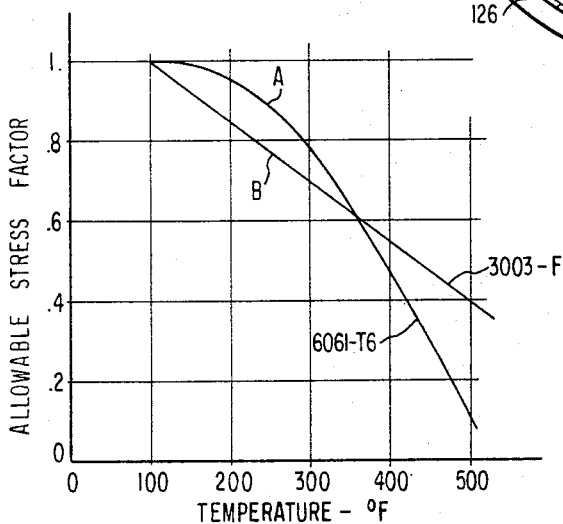
FIGURE 5 is a plot of the allowable stress factor against temperature of two types of lightweight aluminum alloy materials forming the vessel wall which may advantageously employ the temperature compensated pressure relief valve of the present invention.

The manner in which aluminum suffers a strength loss at moderately elevated temperatures may be best appreciated by reference to the graph shown in FIGURE 5. The graph is a plot of the allowable stress factor of two types of standard grade aluminum alloy material against temperature. A boiler or other fluid process pressure vessel may be designed for normal operating temperatures in the zero to one hundred degree temperature range with the allowable stress factor for the 100° temperature being indicated as 1.0. Note that as the temperature increases, the allowable stress factor representative of the rupture strength of the vessel is reduced sharply as the temperature increases. For example, for 6061–T6 aluminum alloy boiler plate material, as indicated by curve A, the boiler plate must be twice as thick if subjected to a 400° temperature than it would be if it were subjected to no more than 100° F., since the allowable stress factor at 400° is approximately .5. When using the 3003–F aluminum alloy material, the thickness of the boiler plate must also be in the order of 2 if the boiler plate is subjected to a temperature in the order of 400° F., in order to maintain sufficient rupture strength.

If, arbitrarily, a one-inch aluminum boiler plate would withstand the design pressure in the normal operating temperature of 0 to 100° F., the same plate would have to have a thickness of 2 inches if it is expected that a 400° temperature might be encountered. With the temperature compensated pressure relief valve of the present invention, the aluminum boiler plate need remain only one-inch thick because the fluid pressure at which it opens reduces in accordance with the manner in which the allowable stress factor reduces with increased temperatures.

Figure 1:
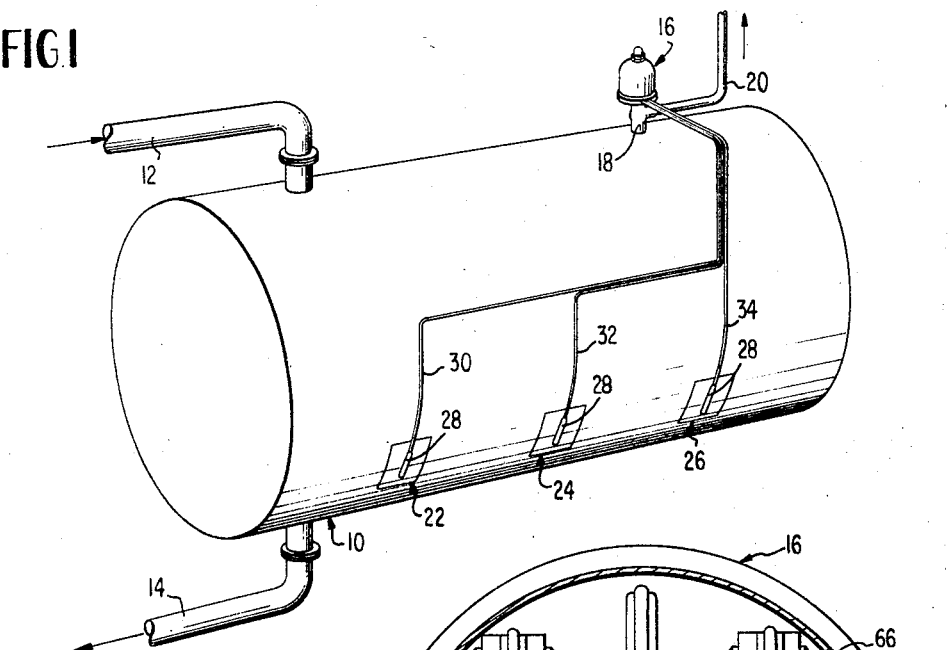
FIGURE 1 is a perspective view of the improved temperature compensated pressure relief valve as employed with a lightweight material pressure vessel having spaced temperature sensing means along the pressure vessel wall.

Referring to FIGURE 1, there is shown a typical pressure vessel application for the temperature compensated pressure relief valve of the present invention. A fluid process line may, for instance, include a pressure vessel 10, such as a boiler, formed of a lightweight material, aluminum for example, such as one of the two alloys indicated in the graph of FIGURE 5. The fluid pressure vessel 10 forms a fluid sealed enclosure including, appropriately, a fluid inlet pipe 12 and a fluid outlet pipe 14 which act to maintain the pressurized fluid within the pressure vessel 10. The pressure vessel further incorporates the improved temperature compensated pressure relief valve 16 which is shown coupled to the pressure vessel 10 by a vertical fluid coupling member or pipe 18 such that the relief valve 16 is vertically oriented. Upon selective opening of the relief valve 16, fluid is diverted from the aluminum pressure vessel 10 through relief conduit 20 in the direction of the right-hand arrow. While the single temperature sensing means may be provided for the temperature compensated pressure relief valve 16, in the embodiment shown, there are provided separate temperature sensors 22, 24 and 26 positioned at spaced locations, longitudinally of the cylindrical pressure vessel 10 and in thermal contact with the vessel surface. The separate temperature sensing means include temperature sensing bulbs 28 of conventional construction carrying an expansible fluid therein in either liquid or gaseous form. Bulbs 28 are connected by capillary tubes 30, 32 and 34 to associated expansible fluid motors in the form of bellows internally of the pressure relief valve structure.

Figure 2:
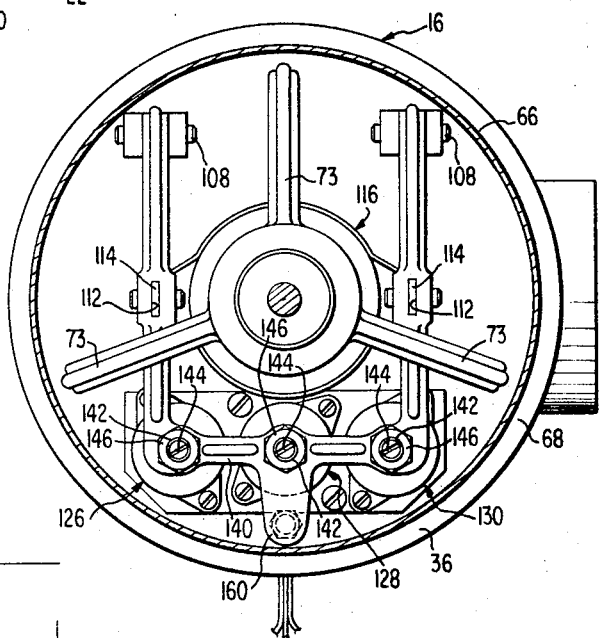
FIGURE 2 is a plan view, partially in section, of the temperature compensated pressure relief valve of the present invention.

Referring to FIGURES 2 through 4, it is noted that the temperature compensated pressure valve 16 includes a horizontally extending base 36 which may be formed as a part of a single element die casting including a vertical section 40 and horizontally extending section 38. Section 38 is threaded at 42 to allow coupling to relief discharge conduit 20. Aperture 44 acts as a fluid port connection between vertical conduit 18 and relief conduit 20. Vertical section 40 is also threaded at 46 for connection to the aluminum pressure vessel 10. An annular valve seat member 48 is provided with a upper recessed section 50 having an annular beveled surface 52 which is of a slightly smaller diameter than the aperture 44. A reciprocating tapered valve disk or member 54 is carried by upstanding valve stem 56. Stem 56 is slidably received within a second aperture 58 at the top of the horizontal tubular section 38 and in line with lower aperture 44. The annular upper opening 58 is recessed centrally at 60 and receives O-ring 62 providing the desired fluid seal to prevent the upward escape of pressurized fluid into valve control chamber 64. The valve control chamber 64 is formed by the annular plate 36 and a cooperating thin wall casing member 66. The casing 66 terminates in an annular flange 68 which is coupled to the flat valve plate 36. The top of the valve casing is apertured at 70 which is also vertically in line with apertures 58 and 44. Annular member 72 of T-shaped cross-sectional configuration is received within the aperture 70 with a threaded smaller portion 74 protruding upwardly. The annular member 72 has coupled thereto at positions spaced 120° apart three support arms 73 which extend outwardly and downwardly terminating at the upper surface of the valve plate 36. The three supporting arms 73 may be welded or otherwse affixed to the plate to provide the desired support. In this manner, the thin casing wall 66 may be relieved of the function of supporting the valve and valve control means. The threaded protruding portion 74 receives a nut 76 locking the thin wall casing 66 in place. Annular member 72 further carries a central bore 78 which is also threaded, and receives a downwardly extending pressure relief valve spring adjusting member or screw 80. The top of screw 80 is provided with an elongated slot 82 allowing the screw to be adjustably moved vertically within the threaded support member 72. Screw member 80 carries a nut 84 which acts to maintain the screw 80 in its vertically adjusted position. A threaded cap member 86 covers the adjustable screw 80 to prevent inadvertent change in adjustment, the cap being threadedly received by support member 72 in abutting relationship to nut 76.

The upper end of valve stem 56 is rounded at 88 and is received within the dimpled portion 90 of a cylindrical cup member 92. The open end 94 of the cup is directed upwardly toward the adjusted screw 80. A coil spring 96 of slightly smaller diameter than the inner diameter of cup 92 is received within the cup member 92, encircling the dimpled bottom portion 90. The upper end of this spring abuts a transversely extending dish-shaped plate member 98. Plate member 98 further abuts the lower end of the screw 80 with the lower end of the adjusting screw 80 received within the cup or dish shaped plate 98. In this manner, the transversely extending valve member 54 is spring-biased against the valve seat member 48, whereupon, in conventional fashion, as the fluid pressure within the pressure vessel 10 increases, it acts against the valve member 54 and the valve stem 56, coil spring 96 and fixed screw 80. When the pressure reaches a predetermined value, and force of the biasing spring 96 is insufficient to prevent the valve 54 from unseating, allowing the fluid to escape upwardly through the vertical section 40 and outwardly through horizontal section 38 to the relief conduit 20.

The present invention is directed to temperature compensation means for the pressure relief valve 16 in which an increase in the surface temperature of the pressure vessel 10 will, in a positive manner, reduce the biasing pressure of valve member 54 against the valve seat member 48 allowing the valve to open at a reduced pressure corresponding to the temperature increase and reduction in the allowable stress on the pressure vessel. The valve plate 36 is provided with a pair of spaced upstanding support members 100 and 102 which may be formed integrally with the valve plate or welded thereto. Members 100 and 102 pivotably support a pair of L-shaped levers 104 and 106, respectively. The L-shaped members extend parallel to each other, from a position on one side of the valve stem transversely across and at right angles to the line of action between the spring adjusting screw 80 and valve stem 56.

Suitable cylindrical pins 108 provide the desired pivotable connection between these members. Intermediate of the lever ends, there is provided a cylindrical bore 110 at a point which intersects the vertical line of action of the valve member.

Referring of FIGURE 2, it is further noted that each of the L-shaped levers 104 and 106 is provided with a vertical slot 112 in line with horizontal bores 110 which receives the upstanding sides 114 of stirrup member 116. Stirrup 116 has a generally U-shaped cross-sectional configuration, as indicated in FIGURE 4, including a dish shaped bottom 118 which joins the two sides 114. The dish shaped bottom includes central aperture 120 to allow the valve stem 56 to pass therethrough for uninhibited vertical movement. The cup shaped member 92 carrying coil spring 96 is further provided with a reverse curve flange 122 at the open end 94. A second coil spring 124 of a diameter in exces of the cup shaped member 92 is positioned concentric of the cup shaped member with its upper end abutting the reverse turn flange 122 and the lower end received within the dish shaped bottom 118 of the stirrup. A pair of cylindrical pins 125 pass through an appropriate opening in the spaced stirrup sides 114 and bores 110 of levers 104 and 106. Compression spring 124 is therefore held in compression between the annular flange 122 and the dished bottom 118 of the stirrup, acting in opposition to inner coil spring 96.

The base plate 36 of the valve structure is further provided, in the preferred embodiment, with three spaced, annular bellows assemblies 126, 128 and 130. Each bellows assembly includes a flexible, cylindrical bellows 132 which may be formed of metal or other like material. The open bottom of the bellows 132 is peripherally sealed at 136 to its annular support member 134. The L-shaped levers 104 and 106 are joined at their nonpivoted ends by transversely extending section 140 which is provided with three spaced threaded openings (not shown) in line with the axis of the bellows assemblies 126, 128 and 130. Each bellows assembly is provided with a temperature adjusting screw 142 which is threadedly received within its associated aperture on the common connecting bar 140. Each temperature adjusting screw 142 is provided with a transverse slot 144 allowing a screw driver or other implement (not shown) to rotate the screw relative to the threaded bore on the bar 140, thereby adjusting its position vertically with respect to the top 138 of the bellows assemblies. Suitable nuts 146 are carried by the screw to lock the adjusting screws in position once the desired adjustment is achieved. It is noted that for each bellows assembly there is provided a central bore 148 which receives an associated capillary lead. The bore 148 extends downwardly from bellows 132, through annular base 134, to plate 36 and outwardly therefrom so as to receive, appropriately, capillary leads 30, 32 and 34 for respective bellows assemblies 126, 128 and 130.

In operation, with the temperature compensated pressure relief valve 16 positioned as shown in FIGURE 1, pressurized fluid may be admitted to and removed from the pressure vessel 10 through pipe members 12 and 14, respectively. Assuming the system is operating at a relatively low temperature in which the temperature sensors 28 sense the wall temperature of the aluminum pressure vessel in the order of 100° F., the fluid pressure adjusting screw 80 may be set such that the biasing pressure of coil spring 90 will allow opening of the valve member 54 at a desired maximum pressure, say 100 p.s.i.a. The temperature adjusting screws associated with bellows assemblies 126, 128 and 130 are adjusted such that upon a temperature increase of the tank at any localized point from 100° to 400°, an associated bellows would expand to commonly rotate lever arms 104 and 106 compressing the outer temperature compensating coil spring 124. This has the effect of further compressing the inner coil spring 96 within the cup-shaped member 92 tending to reduce the overall spring-biasing pressure applied to the valve stem 56 and valve 54. Depending upon the spring rates of the respective coil springs 96 and 124, the overall biasing pressure on the valve member would be reduced to an extent corresponding to the reduction in the allowable stress factor which in this case would be about one-half the stress factor at 100° F. Thus, if the pressure within the aluminum pressure vessel reaches the figure in excess of 50 p.s.i., the valve 54 would move away from the valve seat member 48 allowing discharge of the pressurized fluid from the aluminum pressure vessel 10 through the relief conduit 20. Obviously, should the temperature of the pressure vessel 10 at all points be reduced to a lesser figure, such as 300° F., 200° F., or even the original 100° F., the bellows would compress from their expanded position causing the lever arm assemblies 104–106 to rotate about the pivot pins 108. Coil spring 124 would expand along with coil spring 96 to place a greater biasing pressure on the valve disk 54. With the arrangement shown, screw 80 provides for pressure adjustment while screw 142 associated with each of the bellows assemblies 126, 128 and 130 allow for temperature adjustment of the valve.

In using the temperature compensated relief of the present invention, in conjunction with pressure vessels of lightweight material, such as aluminum, it is necessary to ensure that the pop-off pressure of the valve remains constant when the temperature of the vessel falls below 100° F. This may be achieved in the instant device by a very simple addition of an adjustable stop preventing continued expansion of coil spring 124 as the vessel temperature falls below 100° F. Obviously, as long as the bellows members compress or deflate in response to temperature decrease, the stirrup 116 will continue to move downwardly towards base 36 allowing continued expansion of compression coil spring 124. As indicated in FIGURES 2 and 3, adjacent the bellows assemblies, there is provided an upstanding, fixed support member 150 which is centrally bored and threaded at 154 to receive the threaded end of adjustable stop plug or member 152. The upper end of the plug is knurled at 156 to enhance manual rotation for vertically adjusting the threaded plug 152 with respect to its support member 150. A threaded nut 158 is carried on the threaded end of plug 152 and is screwed into abutting contact with the top of support member 150 once the desired height of the adjustable stop member 152 is achieved. The common connecting bar 140 is provided with a radial extension 160 at the center thereof which overlies the upper end of the adjustable stop member 152 such that upon collapsing of the bellows assemblies, the normal tendency for the bar 140 to move downwardly ceases at a point corresponding to 100° F., since extension 150 contacts the adjustable stop member 152 and prevents further expansion of compensating coil spring 124. If the stop were not provided, the pressure at which the valve would pop-off would increase as the temperature of the vessel falls below 100° F. and could create an unsafe condition.

While the temperature compensated relief valve, in the embodiment shown, includes three bellows assemblies separately coupled by capillary means to associated temperature sensing bulbs, spaced along the surface of the lightweight pressure vessel, it is obvious that the bellows assemblies 126 and 130 may be readily eliminated from the relief valve, in which case a single temperature responsive actuator would vary the compression of coil spring 124 and its effect on the fluid pressure biasing spring 96. Further, while the apparatus employs a pair of concentric coil springs, it is envisioned that minor structural changes could be made by using first and second leaf springs which would operate in the identical manner to provide the desired positive temperature compensation. Depending upon the selection of the lightweight material to be used for the pressure vessel, coil springs 96 and 124 may be readily exchanged for other coil springs having differing spring constants to ensure the proper rate reduction in the biasing pressure for the relief valve depending upon the increase in temperature of a selected lightweight material pressure vessel. Further, while the temperature sensors 22, 24 and 26 are shown as being coupled to the exterior surface of the pressure vessel 10, longitudinally along the side wall, it is readily apparent that the sensors may be employed within the pressure vessel and/or on the spaced end walls. Also, while none of the materials forming the relief valve are critical, the materials, such as the stirrup 116, cup 92 and plate 98, may be readily formed of thin metal stock and these elements, as well as each of the bellows assemblies may be thermally isolated from the pressure vessel by employing a thin layer of thermal insulation on the upper surface of the disk like base 36. Finally, the valves are individually adjustable. To adjust the biasing force of coil spring 96, the threaded cap 86 may be removed exposing the stop nut 84 and the adjusting screw 80. If adjustments must be made to one of the temperature adjusting screws 142, the lower threaded nut 76 may be removed, whereupon the outer wall casing 66 is moved upwardly from the annular support member 72 exposing completely the interior of the valve control chamber.

While there have been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. An improved temperature compensated pressure relief valve for a lightweight pressure vessel comprising a reciprocating valve member movable along a line of action between a closed position and an open position to effect pressure relief for said vessel, an abutment, a valve biasing means including a first coil spring coaxial of the line of action of said valve member and positioned between said valve member and said abutment, transversely extending lever means mounted for oscillatory movement along said line of valve action, a second coil spring mounted concentrically of said first coil spring on said lever means and exerting a biasing force in opposition to said first coil spring, and temperature responsive fluid motor means coupled to said lever means for compressing said second spring in response to temperature increase of said pressure vessel for reducing the biasing force of said first coil spring in proportion to the reduction of allowable stress of said pressure vessel resulting from an increase in the temperature of said vessel.

2. The apparatus as claimed in claim 1 further including means for mechanically adjusting the biasing force of said first and second coil springs.

3. An improved temperature compensated pressure relief valve for a lightweight fluid pressure vessel having a pressure relief passage comprising; reciprocating valve means movable between a closed position for said passage and an open position for said passage to effect pressure relief for said vessel, a first coil spring mounted coaxially of said reciprocating valve for biasing said valve to said closed position, a second coil spring concentric to said first coil spring for counteracting the bias of said first coil spring, a plurality of temperature responsive elements in temperature sensing relationship to said vessel and in spaced positions whereby each element senses the temperature of said vessel at a respective position, and common means controlled by any one of said temperature responsive means for controlling said second spring to counteract the bias of said first spring in proportion to the reduction in allowable stress of said pressure vessel due to a temperature change adjacent a respective one of said sensing positions.

4. An improved temperature compensated pressure relief valve for a lightweight fluid pressure vessel comprising an elongated valve stem having a valve disc at one end and reciprocably movable with said disc between a closed position and an open position to effect pressure relief for said vessel, a dimpled cup in contact with the other end of said valve stem with the open end of said cup extending away from said disc, an adjustable abutment, a first coil spring mounted coaxially of said reciprocable valve disc and stem within said cup and bearing against said adjustable abutment for biasing said valve to a closed position, a second coil spring concentric to said first coil spring, a stirrup positioned coaxially of said valve stem for free movement therealong, transversely extending lever means for supporting said stirrup for limited oscillatory movement in line with said stem, means including said cup member and said stirrup for maintaining said second coil spring compressed therebetween to counteract the bias of said first coil spring, bellows means operatively connected to said lever means, and temperature sensing means responsive to an increase in temperature of said pressure vessel for controlling said bellows, means for compressing said second coil spring to reduce the spring biasing force of said first coil spring on said reciprocable valve disc in proportion to the reduction in allowable stress on said pressure vessel resulting from an increase in the temperature of said vessel.

5. The apparatus as claimed in claim 4 wherein said bellows means comprises a plurality of bellows members, means to allow each bellows member to act separately upon said lever means, and means for coupling said bellows members independently to temperature sensing means at spaced locations along said pressure vessel whereby said temperature compensated pressure relief valve is rendered sensitive to localized heating of said pressure vessel.

6. The pressure relief valve as claimed in claim 5 further including positive stop means for preventing the decrease of the biasing force exerted by said second spring below a predetermined minimum.

7. The pressure relief valve as claimed in claim 4 further including adjustable stop means positioned in the path of said lever means for preventing movement of said stirrup in a direction away from said fixed abutment to prevent the reduction of the biasing force of said second coil spring below a predetermined minimum value.

References Cited

UNITED STATES PATENTS

| | | | |
|---|---|---|---|
| 886,945 | 5/1908 | Clarke | 236—92 |
| 2,159,979 | 5/1939 | Parsons | 137—522 |
| 2,223,115 | 11/1940 | McDermott | 137—522 X |
| 2,564,295 | 8/1951 | Benz et al. | 236—92 X |
| 2,586,972 | 2/1952 | McKenzie | 236—92 X |
| 2,598,351 | 5/1952 | Carter | 236—93 |

ROBERT A. O'LEARY, *Primary Examiner.*

W. E. WAYNER, *Assistant Examiner.*